United States Patent
Baker (10) Patent No.: US 6,580,694 B1
(45) Date of Patent: Jun. 17, 2003

(54) ESTABLISHING OPTIMAL AUDIO LATENCY IN STREAMING APPLICATIONS OVER A PACKET-BASED NETWORK

(75) Inventor: Carl R. Baker, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/374,682

(22) Filed: Aug. 16, 1999

(51) Int. Cl.[7] ................................................ H04J 3/14
(52) U.S. Cl. ...................................... 370/252; 370/517
(58) Field of Search ................................ 370/252, 508, 370/516, 517, 519, 260

(56) References Cited

U.S. PATENT DOCUMENTS

| | | | | |
|---|---|---|---|---|
| 6,212,206 B1 | * | 4/2001 | Ketcham | 370/516 |
| 6,301,258 B1 | * | 10/2001 | Katseff et al. | 370/412 |
| 6,366,959 B1 | * | 4/2002 | Sidhu et al. | 709/231 |
| 6,389,032 B1 | * | 5/2002 | Cohen | 370/412 |
| 6,452,950 B1 | * | 9/2002 | Ohlsson et al. | 370/516 |

OTHER PUBLICATIONS

*Call signalling protocols and media stream packetization for packet–based multimedia communication systems*, ITU–T Recommendation H.225.0 (Feb. 1998), Table of Contents (pp. iii–vii), Annex A.5.1 (pp. 72 and 74), Annex B.4.1 (p. 103), and Annex F.3 and F.4 (p. 116).

*Establishing Optimal Latency in Streaming Data applications that use Data Packets,*, U.S. Patent Application Ser. No. 223,439, filed Dec. 30, 1998 (P6555).

* cited by examiner

*Primary Examiner*—Chau Nguyen
*Assistant Examiner*—Nhat Do
(74) *Attorney, Agent, or Firm*—Blakely, Sokoloff, Taylor & Zafman LLP (57) ABSTRACT

An embodiment of the invention is a method of helping establish optimal latency in audio streaming applications over a packet switched network. The method involves determining whether an elapsed time between arrival of first and second packets, the packets being parts of a stream of audio sent by a transmit process through the network and received by a receive process, is primarily a network delay due to the second packet being slowed while traveling through the network, or primarily a transmit delay due to a delay by the transmit process in sending the second packet. The elapsed time is included as part of interpacket delay statistics only if it is determined that the elapsed time is primarily due to the network delay. The latency may then be adjusted by adjusting the size of a packet queue based on more accurate interpacket delay statistics.

19 Claims, 6 Drawing Sheets

ESTABLISHING OPTIMAL AUDIO LATENCY IN STREAMING APPLICATIONS OVER A PACKET-BASED NETWORK

FIELD OF THE INVENTION

This invention is generally related to multimedia communications over a packet switched network, and more particularly to techniques of establishing optimal audio latency in streaming applications such as conferencing.

BACKGROUND

In many network-based multimedia applications, data is sent from a first point to a second point in packets. The packets are decoded when received at the second point and played back on playback hardware. For example, in the case of streaming audio or video multicasting, a transmit process sends to a number of destinations over a network the packets of data that make up the desired audio or video, where the packets are received by a receive process, decoded, and played back. In another example, in a two -or multi-party video or audio conference, the parties send back and forth data packets over a network which are then decoded at the receiving parties and played back. Such streaming applications are especially popular over the Internet and corporate intranets.

A difficulty with such applications, however, is that the transmittal and receipt of the data packets through the network may become hampered. Packets may be held up, or lost, for example, throughout the network. Also, the bandwidth at which a given party can receive or send packets may be limited. The practical effect of these problems is that the parties may find their audio and/or video streams broken up—that is, the resulting multimedia stream when played may be choppy, such that the perceptual quality of the playback may be degraded.

A limited solution to this problem is to introduce a predetermined fixed latency in the data stream, via a buffer or other mechanism. In this way, if packets are held up in the network and are expected to be delayed by an average of, for instance, one second, playback at the receiving end is not affected if a one second buffer is used. This solution has some success in one-way multicast situations, where a source is transmitting data for playback on multiple destinations. This is because the destinations only receive data packets, and are not expected to send responsive data packets to the source or the other destinations. The initial one second delay required to fill the buffer with packets can be tolerated at the beginning of the transmission.

However, in other situations, introduction of a fixed latency is less than optimal. For example, in the case of audio or video conferences over a network, where communication is two-way among the parties of the conference, introduction of a fixed latency may adversely affect the quality of the conference if the latency is too large. The parties may find, for example, that their ability to respond in a timely manner to the others in the conferencing session is hampered. That is, because the parties normally assume that the conference is occurring in real-time, similar to an in-person conversation, when in reality the conference is being buffered, it may be difficult for the parties to interrupt one another in a manner that resembles a normal, in-person conversation. For instance, with a one second buffer at each end of a conference, the parties will experience a round-trip delay of at least two seconds in receiving a response from another party in the conference. Such a lengthy delay can easily disrupt the normal conversation between two persons.

SUMMARY

An embodiment of the invention is directed to a method of determining whether an elapsed time between arrival of first and second packets, the packets being parts of a stream of audio sent by a transmit process through a network and received by a receive process, is primarily a network delay due to the second packet being slowed while traveling through the network, or primarily a transmit delay due to a delay by the transmit process in sending the second packet. The method includes the elapsed time as part of interpacket delay statistics only if it is determined that the elapsed time is due to the network delay. The size of a packet queue is adjusted based on the interpacket delay statistics.

Other features and advantages of the invention will be apparent from the accompanying drawings and from the detailed description that follows below.

BRIEF DESCRIPTION OF THE DRAWINGS

The invention is illustrated by way of example and not by way of limitation in the figures of the accompanying drawings in which like references indicate similar elements and in which.

DETAILED DESCRIPTION

Figure 1:
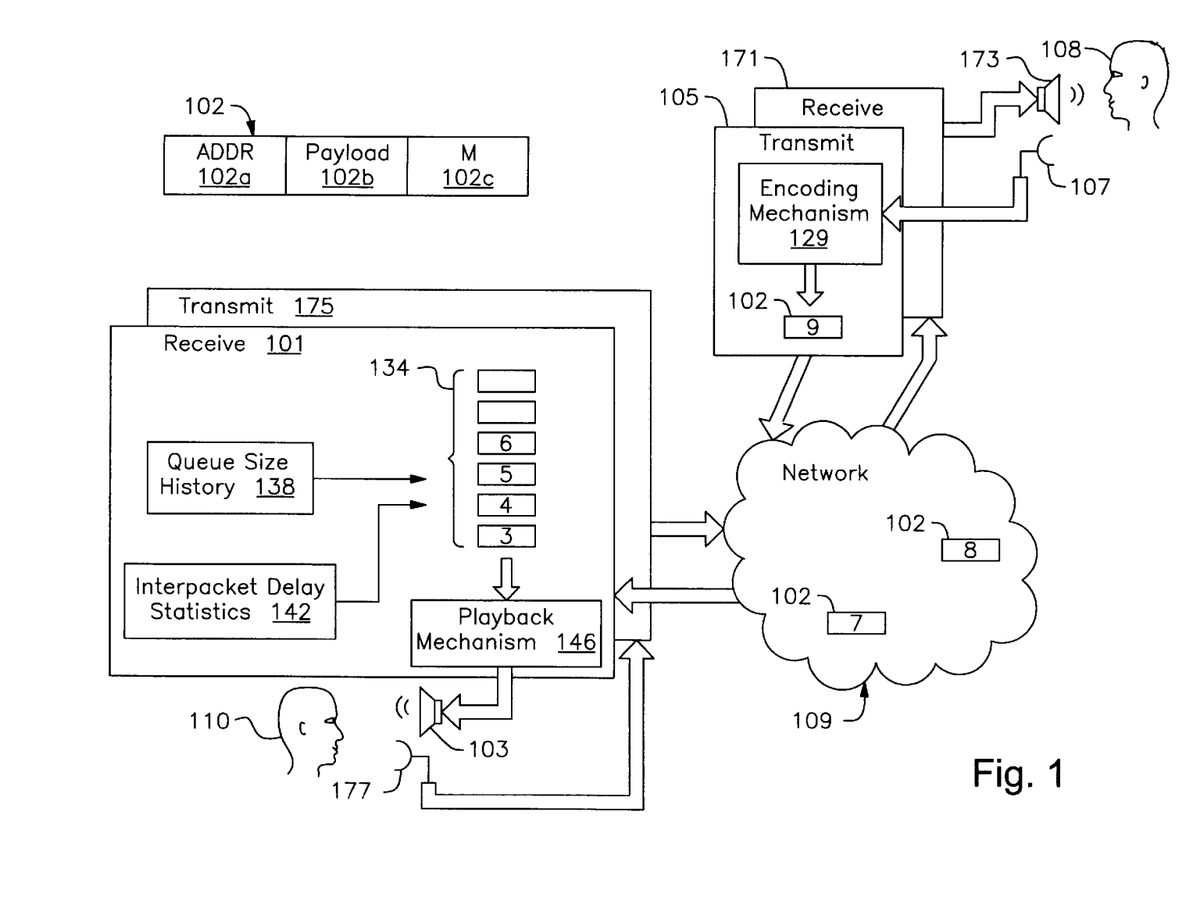
FIG. 1 shows an overview of a conferencing application configured according to an embodiment of the invention.

According to an embodiment of the invention, a method of establishing optimal latency by varying the size of a buffer in an audio stream is described in which interpacket delays that are measured by the destination machine which receives the packets are included in the delay statistics only if the particular interpacket delay is found to be primarily due to network delay rather than transmit delay. In this way, the delay statistics that are used to determine the size of the buffer will more closely represent the actual network delay, thereby allowing a more accurate determination of the optimal buffer size. FIG. 1 illustrates an overview of a source-destination connection which can benefit from an embodiment of the invention. It should be noted that references to "an" embodiment in this disclosure are not necessarily to the same embodiment, and they mean at least one.

FIG. 1 illustrates a conferencing session between two individuals 108 and 110 that can be improved by an embodiment of the invention. The conversation between the individuals can be part of a multimedia application such as Internet telephony or video conferencing, although some of the benefits of the invention are particularly apparent with the audio portion of the conference only. The user 108 speaks into a microphone 107 and hears from a speaker 173, whereas the user 110 speaks into a microphone 177 and hears from a speaker 103. The microphone and speaker at each machine can be part of a full duplex sound system that operates on a personal computer (PC) platform. A transmit process 105 in a source machine captures audio from the microphone 107, and breaks up and places the audio stream into digital packets using a conventional encoding mechanism 129. The transmit process 105 may be, for instance, part of an Internet phone client or a wide range of other clients in multimedia applications. The packets are then sent through a network 109 of computers. A connected computer application elsewhere on the network 109 receives these packets at a receive process 101 in a destination machine and stores the packets in a buffer also known here as a packet queue 134. The packets are then fed, in a first in first out fashion, to a conventional playback mechanism 146 which converts the packet into a digitized stream of audio that is played back on the speaker 103.

The audio playback mechanism 146 typically relies on the delivery of packets from the packet queue 134 according to a consistent schedule, in order to generate a smooth stream of audio that faithfully replicates the user's speech that was captured by the transmit process 105. The playback mechanism 146 includes a number of software and hardware components, such as an audio and/or video decoder that produces a digitized stream from the packets, silence detectors used for inserting periods of silence in the audio stream, as well as a host of audio processing algorithms including noise reduction and echo cancellation. In the example of FIG. 1, Packet 2 is being played back by the receive process 101, while packets 3–6 are waiting in the packet queue 134. Packets 7 and 8 are in transit, whereas packet 9 is about to be launched into the network 109. Of course, the reverse operation can occur independently between the destination and the source machines, by way of the transmit process 175 (which is identical to the transmit process 105) and receive process 171 (which is identical to the receive process 101), so that when the user 110 begins to speak into the microphone 177 and the speech is played back through the speaker 173, a two-way full or half duplex conversation is established.

Each packet 102 includes an address field 102a that contains the network address of the receive of the packet, a payload field 102b which contains a portion of the audio stream that constitutes the conversation, and a marker field 102c. The significance of the marker 102c can be appreciated by reference to FIGS. 2 and 3. It should be noted that the term "packet" and "packetizing" in this disclosure generally refers to the concept discretizing a larger amount of data, such as an audio stream or a file, according to any one of a number of different protocols. For instance, a "packet" can be a traditional structure, by the same name, used in the transmission control protocol/internet protocol (TCP/IP) suite of protocols. A "packet" is also synonymous with "cell" as used by asynchronous transfer mode (ATM) protocols.

Figure 2:
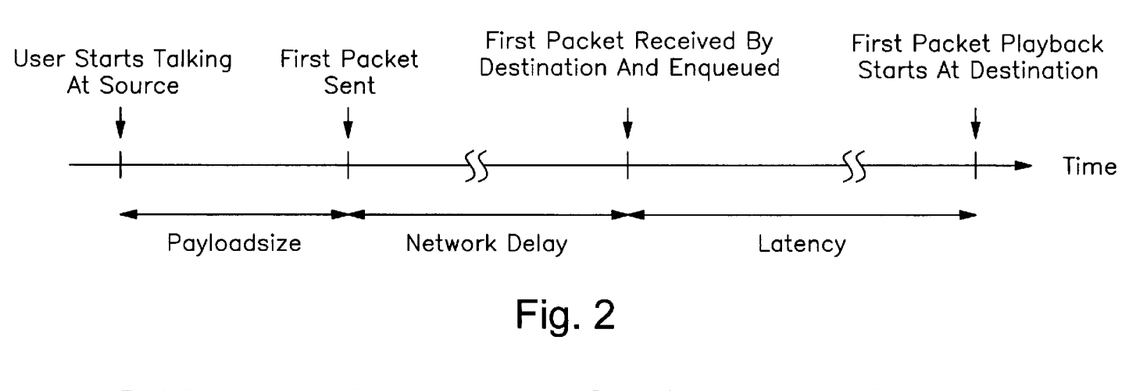
FIG. 2 defines certain time periods for describing the invention.

FIG. 2 represents a timeline of events that are used to define various terms describing the embodiments of the invention. Referring back to FIG. 1, when the user 108 starts talking, the transmit process 105 begins to capture the speech and places this stream of speech into consecutive packets. In most conventional systems, the payload size and the size of each packet 102 are fixed, although the invention is not limited to packets having a fixed size since, in the ATM protocol, the cell size can vary. For instance, in certain conferencing systems, the payload size is fixed at 30 milliseconds, such that every 30 milliseconds of the user's speech is stored in a separate data packet. Assuming that packets are sent into the network 109 as soon as they have been formed, the time between the first packet being sent and the time at which it is received by the receive process 101 (and has been enqueued) is known as the network delay. Alternatives include the addition of some buffering at the transmit process 105 before the packets are launched into the network 109.

Figure 3:
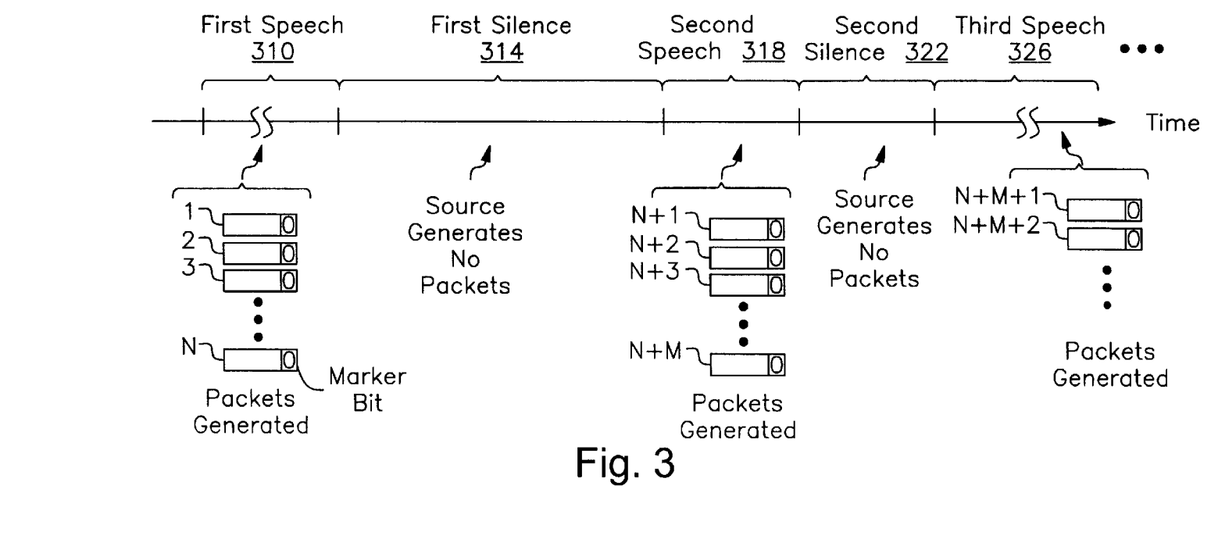
FIG. 3 illustrates an exemplary time line of events on the transmit side of a conferencing system of the invention.

After a packet has been enqueued in the receive process 101, it must wait until all earlier packets in the packet queue 134 have been played back before itself can be played back. This delay is known as latency and depends on how many packets are in the packet queue 134 at any given time, as well as on the size of the packet queue 134. When a packet reaches the head of the packet queue 134, playback can begin and will last for as long as the payload size. Meanwhile, other packets can be simultaneously received and then stored at the tail of the packet queue 134. FIG. 3 will illustrate the timeline of events that occur when the user 108 stops talking such that a period of silence is encountered by the transmit process 105.

The first speech 310 in FIG. 3 results in packets 1 . . . N being generated by the transmit process 105. Note that a marker bit, corresponding to the marker field 102c, in each packet 102 has been cleared in all of these packets. Following the first speech 310, a period of first silence 314 ensues. However, for the duration of the first silence 314, the transmit process will generate no packets. Thereafter, with the second speech 318, the transmit process resumes the generation of packets N+1. . . N+M. In contrast to the first packet generated for the first speech 310, the N+1 packet for the second speech 318 has its marker bit set. The marker bit is an indication from the transmit process that the particular packet was generated following a period of silence detected by the transmit process. From the point of view of the receive process 101, the marker bit being set signifies that the delay in arrival of the N+1 packet is primarily attributed to a delay by the transmit process 105 in sending the packet into the network 109, rather than a delay caused by the N+1 packet being slowed down while traveling through the network 109.

Although no packets were generated for the first silence 314, the playback at the receive process 101 will still sound correct to the user 110, because the playback mechanism 146 will simply default to generate silence if it receives no packets from the packet queue 134 (which is empty following the playback of the N packet until the arrival of the N+1 packet). Returning to FIG. 3, after the second speech 318, a second period of silence 322 appears during which no packets are generated by the transmit process. Thereafter, with third speech 326, the transmit process resumes the generation of packets with the N+M+1 packet which will have its marker bit set. Note that only the initial packet has its marker bit set for each period of speech that follows a period of silence. Such use of the marker bit has been proposed in ITU-T Recommendation H.225.0, "Call Signaling Protocols and Media Stream Packetization for Packet Based Multimedia Communications," February 1998, by the International Telecommunications Union.

The description above in connection with FIGS. 2 and 3 explained the inner workings of a conferencing session that features a built-in latency in the receive process to help hide the delays in receiving packets from the network. Referring momentarily to FIG. 1, a technique that helps optimize this latency is to vary the size of the packet queue 134 according to the expected delay in receiving packets from the network 109. For instance, if a particular Internet connection between two users is repeatedly showing a delay of approximately 1 second between the arrival of packets at the receive process 101, then the size of the packet queue 134 will be adjusted so that 1 second worth of packets are stored before playback begins. Meanwhile, interpacket delay statistics 142 are collected by the receive process 101. The statistics may include, for instance, a histogram that shows the distribution of elapsed times between consecutive packets arriving from the network as part of an ongoing audio or audio visual conferencing session. If, at a later time, these interpacket delay statistics indicate that the average delay between the arrival of two consecutive packets has increased substantially, only then will the size of the packet queue 134 be increased to introduce greater latency. This greater latency is necessary to ensure that the playback mechanism 146 in the receive process 101 is continuously fed with packets during a period of speech. Otherwise, the audio which is played back through the speaker 103 can break up, become distorted and even unintelligible if packets are not continuously provided to the playback mechanism 146 for the period of speech.

The embodiments of the invention described here are aimed at improving the above process of adjusting the latency, by allowing for a more accurate accumulation of interpacket delay statistics 142. Improving the quality of the interpacket delay statistics 142 will not only help prevent uncalled for increases in the size of the packet queue 134, but it may also help in more timely reductions in the size of the packet queue 134, thus helping achieve optimal latency at all times. FIGS. 4–7 illustrate flow diagrams that describe an embodiment of the invention. Note that only the technique for adjusting the size of the packet queue 134 in the receive process 101 will be described in detail. Details concerning the encoding of the audio information into packets by the transmit process 105 and details concerning the conversion of packets by the playback mechanism 146 in the receive process 101 are not discussed in any detail as they are well-known to those of ordinary skill in the art.

Figure 4:
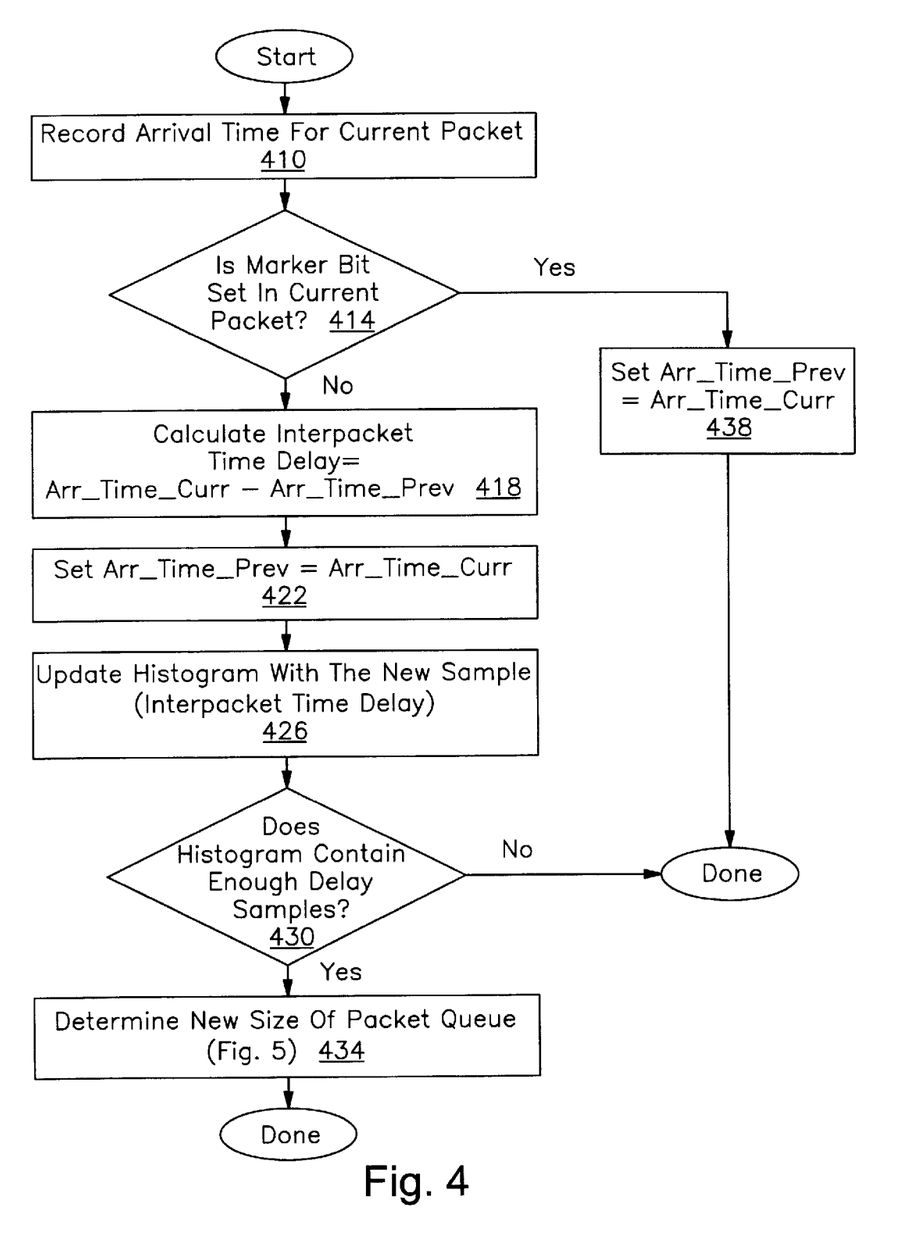
FIGS. 4–6 are flow diagrams that describe an embodiment of the invention.

Turning now to FIG. 4, operation begins in step 410 with the recording of the arrival time of a current packet in the receive process 101. Step 410 is then followed by a decision block 414 in which the marker bit of the current packet is checked. If the marker bit is not set, then an interpacket time delay is calculated by taking the difference between the current packet's arrival time and the arrival time of a previous packet in step 418. The variable arr_time_prev is then set equal to the arrival time of the current packet in step 422. Operation then continues with step 426 in which a histogram that contains interpacket delay statistics is updated with a new sample being the interpacket time delay that was calculated in step 418. Operation then continues with step 430 in which the histogram is checked to see if there are enough delay samples. The above-described series of operations 410–430 can be repeated as often as packets are received in order to build up a histogram with enough delay samples. The number of required delay samples in the histogram can be determined by one of ordinary skill in the art, based on, for instance, a trial and error procedure, as a function of the quality of the audio playback and the type of transmission link between the transmit and receive processes. Upon reaching the required number of samples in the histogram, operation continues with step 434 in which a new size of the packet queue is determined. Thereafter, the new size can be applied to the packet queue, so that no packets are played back from queue until the queue has been filled to its new capacity.

The initial size of the queue upon the start of a conferencing session can be selected by one of ordinary skill in the art, according to varying points of view. Thereafter, the queue size may be updated whenever the required number of samples have been stored in the histogram. In addition, the queue size may be updated, even while the histogram does not contain a sufficient number of samples, if there is a large variance in the interpacket delays of only a few stored samples.

Referring to FIG. 4, if the marker bit in a received packet has been set, then operations 418–426 are bypassed with operation 438 in which the variable arr_time_prev is set equal to the arrival time of the current packet, without updating the histogram with a new sample. In this way, the current elapsed time between arrival of the current packet and the previous packet is not included as part of the interpacket delay statistics 142. That is because, as indicated by the marker bit being sent, the packet was generated following a period of silence, so that the delay in the arrival of the current packet can be assumed to be primarily due to the period of silence, rather than a delay due to the packet's travel through the network. By including the elapsed time between packets as part of delay statistics 142 only if it is determined that the elapsed time is due to the network delay, rather than a transmit delay that may have been caused by a period of silence, the interpacket delay statistics that will be used to adjust the latency will better reflect the true network delay that is being addressed by the latency.

The invention is not limited to the above described technique of checking the marker bit to determine whether the current packet was generated following a period of silence. An alternative technique would be to compare the energy of the payload in the current packet received by the destination machine with the payload energies of one or more previously received packets. Such a technique may be an alternative that can be automatically performed by the receive process in the destination machine if the marker bits of one or more packets are either not sent or are being used incorrectly by the transmit process.

Returning now to FIG. 5, the new size of the packet queue (NPQS) is determined in step 502 based on the histogram which has accumulated in it the interpacket delays. Details concerning the computing of the NPQS will be given below in connection with FIG. 6. Once the NPQS has been computed (whether through FIG. 6 or other alternative techniques), a recent applied packet queue size is selected from a queue size history 138 (see FIG. 1 momentarily) and compared to the NPQS in step 506. The size history includes a number of recent applied packet queue sizes (APQS). An APQS is the actual size of the packet queue 134 that has been previously implemented in the receive process 101, when conversion of packets for playback from the packet queue only occurred after the packet queue having a size according to the APQS became full. This comparison is made to adjust the NPQS in step 514 for a more flexible control of the latency in a conferencing session.

Figure 5:
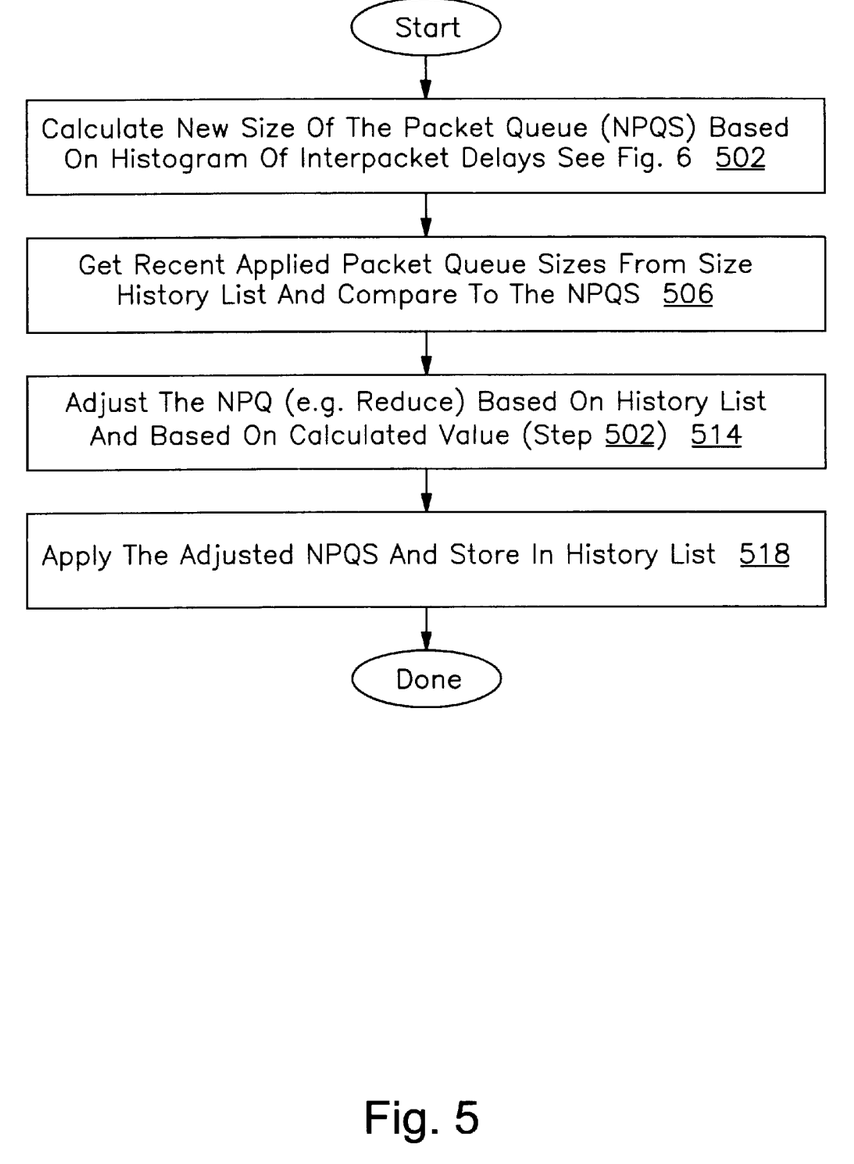

The NPQS is adjusted in step 514 in proportion to one or more recent APQSs indicated by the queue size history 138. According to another embodiment of the invention, the net result here is that upward adjustments to the size of the packet queue are determined only by the current interpacket delay statistics 142, whereas downward adjustments to the size of the packet queue are in proportion to both the interpacket delay statistics 142 (step 502) as well as the size history 138 (step 514). It has been further determined, according to an embodiment of the invention, that the upward adjustment should be more proportional than downward adjustments, particularly when the transmission link between the transmit and the receive processes is susceptible to delays that occur randomly and have particularly long durations, such as may appear in the Internet. In a particular embodiment of the invention, the downward adjustment is less proportional than the upward adjustment whenever one or more recent APQSs from the size history 138 are substantially larger than the queue size suggested by the interpacket delay statistics 142. For example, if recent APQSs in the size history 138 indicate that the packet queue size has been equivalent to 8 packets, but the NPQS obtained based on the most current interpacket delay statistics 142 is the equivalent of 2 packets, then it may be advisable to reduce the packet queue size to an equivalent of 7 packets, rather than all the way down to 2 packets.

On the other hand, if recent history indicates that the packet queue size has been substantially smaller than what is indicated by the current interpacket delay statistics, then it is advisable to immediately apply the NPQS. The calculation of a large NPQS announces the onset of relatively long network delay, as compared to the period of time between adjustments to the size of the packet queue 134. In other words, the size of the packet queue 134 is allowed to increase as quickly as it is called for by the current interpacket delay statistics 142, but is decreased more slowly even if a sharp decrease is indicated by the interpacket delay statistics 142. Once the NPQS has been adjusted in step 514, operation continues with step 518 in which the adjusted NPQS is applied to actually change the size of the packet queue 134. The applied NPQS is added to the size history 138.

Figure 6:
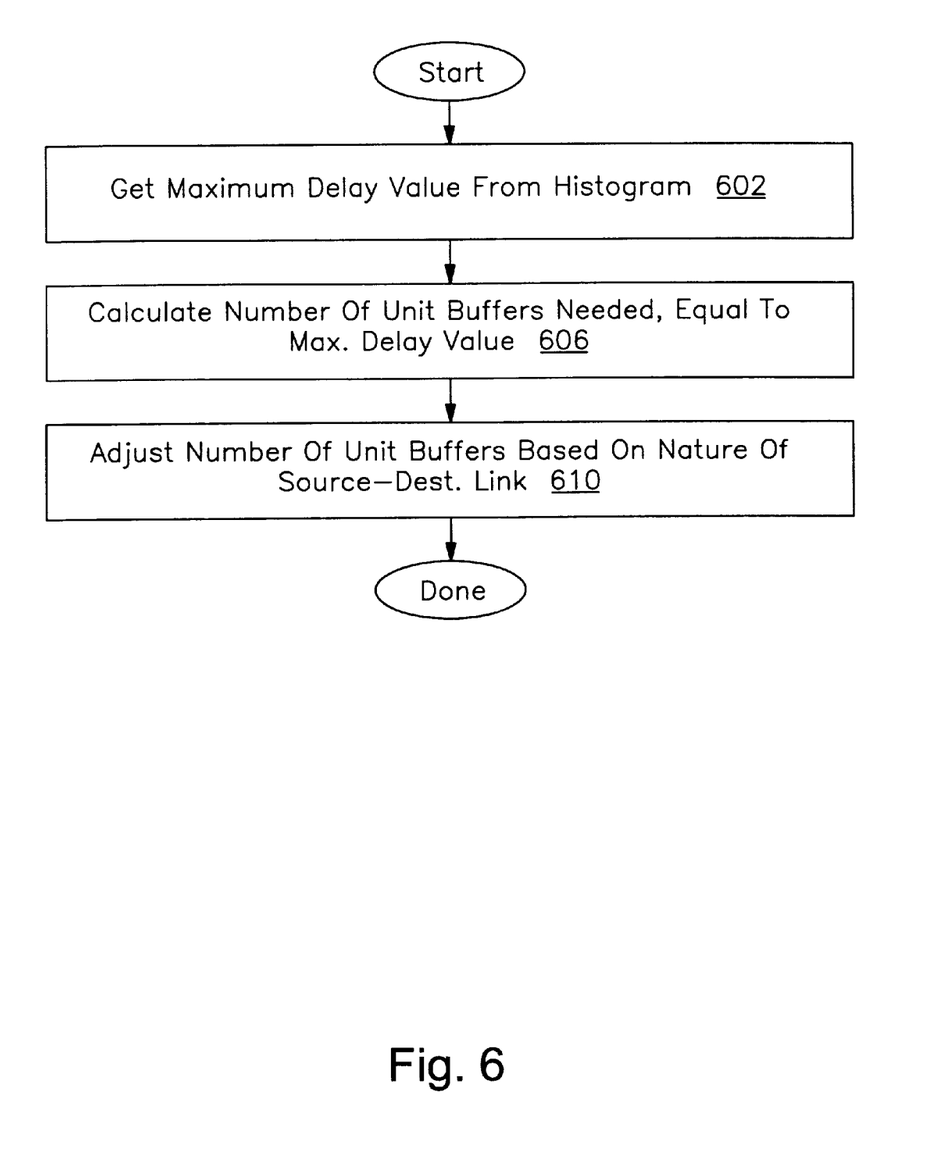

Returning to step 502, the NPQS may be calculated according to the flow diagram of FIG. 6. The maximum interpacket delay value from the histogram is obtained in operation 602. This may be done according to one of a variety of known statistical techniques. Operation then continues with step 606 in which the number of unit buffers, which together are equal to the maximum delay value, are calculated. Each unit buffer is large enough to store the payload size of a single packet 102. The number of unit buffers are obtained by dividing the maximum delay value by the payload size (e.g., 30 milliseconds for H.323 applications) to determine the equivalent number of unit buffers. Operation may then continue with an optional step 610 in which the number of unit buffers are adjusted based on the nature of the transmit-receive link. For instance, the transmission link may include at least one of dial-up modem, integrated services digital network(ISDN), T1, digital subscriber line (DSL), cable modem, corporate intranet, and even perhaps a simply local area network (LAN). To provide a greater margin of safety for ensuring that the packet queue will be large enough so as to not run out of packets during a conferencing session (and thus avoid a break up in the playback), the calculated number of unit buffers in step 606 can be increased according to the expected network delay that might appear for each type of transmission link. For instance, the number of unit buffers should be increased when the transmission link includes a dial-up modem, whereas at the other end of the spectrum with a high-speed intranet, the number of unit buffers calculated in step 606 should be left unchanged.

Figure 7:
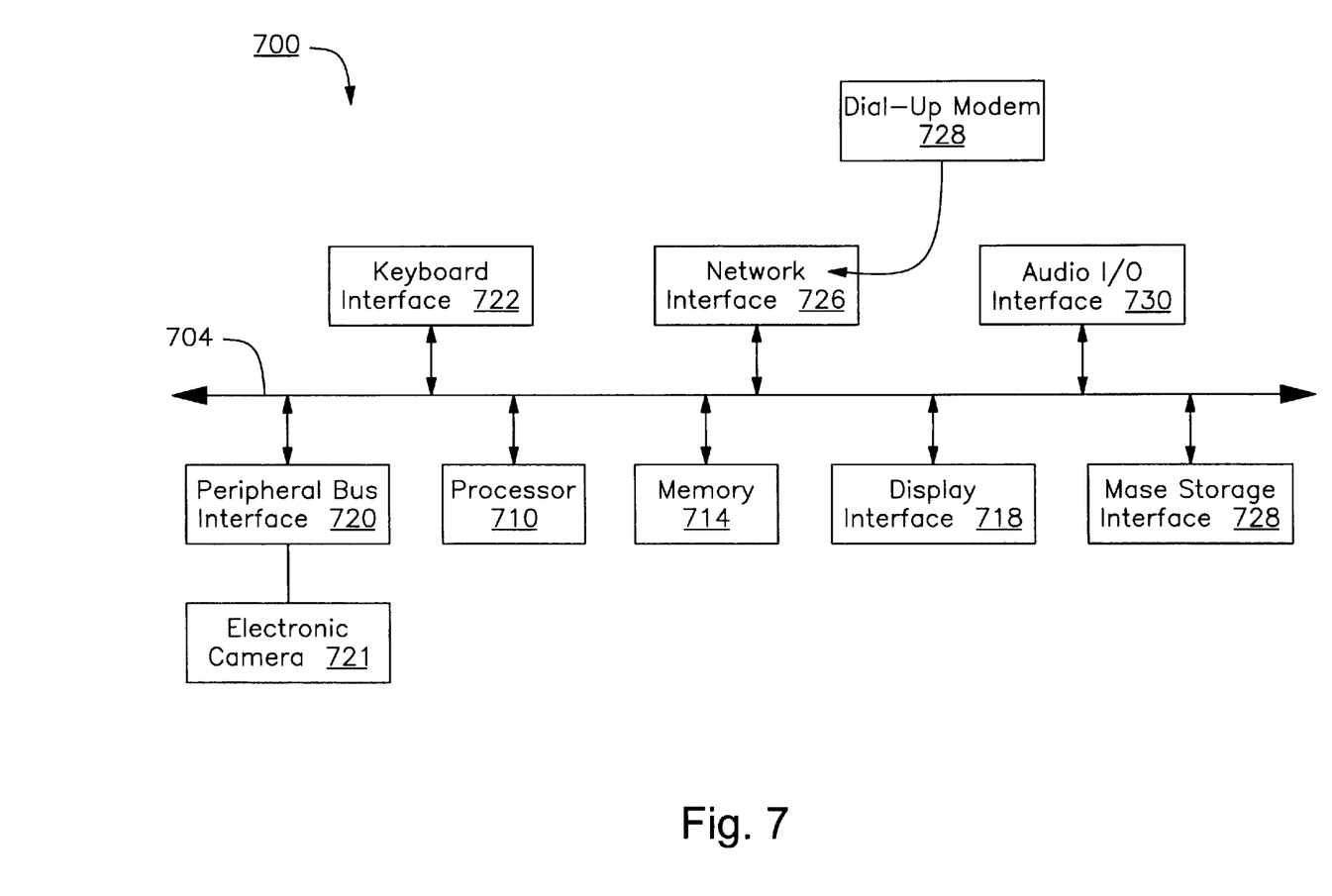
FIG. 7 is a block diagram of a computer that can be used for implementing the invention.

The techniques for establishing optimal latency described above can be implemented in a wide range of products that permit a two-way conference over a network. For instance, the transmit process 175 and receive process 101 can be implemented in a computer system as shown in FIG. 7. The computer system 700 includes a bus 704 which is shared by a number of bus devices, including a processor 710, a memory 714 that will be used to store program memory, a mass storage device 728 that may include a magnetic rotating disk device or an optical rotating disk such as a CD-ROM device, a display interface 718 as a hardware interface to a cathode ray tube or other suitable display device, a keyboard interface 722, a network interface 726 that provides a hardware connection to a transmission medium shared by the network (e.g. via a dial-up modem 728), an audio I/O interface 730 that provides a hardware connection to an audio pickup device such as a microphone and an audio output device such as a speaker, and a peripheral bus interface 720 that can be used to receive video from an electronic camera 721. The software components that will reside in the computer system 700 are not shown expressly, however, as understood by one of ordinary skill in the art, they are inherent.

The processor 710 can be a microprocessor that is capable of decoding and executing a computer program such as an Internet telephony or video conferencing application program and an operating system. The memory 714 and the mass storage 728 are configured with instructions which when executed by the processor 710 will configure the computer system 700 to perform the functionality described above in different aspects of the invention. The instructions for the transmit and receive processes whose functions were described above may initially be obtained over the network connection, or they may be obtained while stored on a machine-readable medium in a portable storage device such as a CD-ROM before being transferred to the memory 714 for execution by the processor 710.

To summarize, techniques for establishing optimal audio latency in conferencing applications have been described. By adjusting the latency according to more accurate interpacket delay statistics and through the use of a history of previous packet queue sizes, the various embodiments of the invention help prevent the latency from becoming too large, thus promoting better quality two-way conversations, while at the same time provide sufficient latency as to reduce the possibility of breakup at the playback mechanism. In the foregoing specification, the invention has been described with reference to specific exemplary embodiments thereof. It will, however, be evident that various modifications and changes may be made thereto without departing from the broader spirit and scope of the invention as set forth in the appended claims. For instance, although the functions of the transmit and receive processes described above can be implemented using a programmed processor, an alternative is to use hardwired logic circuitry to provide greater processing speed and/or greater system integration. The specification and drawings are, accordingly, to be regarded in an illustrative rather that a restrictive sense.

What is claimed is:

1. A method comprising:
   determining whether an elapsed time between arrival of first and second packets, the packets being parts of a stream of audio sent by a transmit process through a network and received by a receive process, is primarily a network delay due to the second packet being slowed while traveling through the network, or primarily a transmit delay due to a delay by the transmit process in sending the second packet;
   including the elapsed time as part of interpacket delay statistics only if it is determined that the elapsed time is primarily due to the network delay; and
   adjusting a size of a packet queue based on the interpacket delay statistics.

2. The method of claim 1 wherein the determining includes checking the second packet for an indication from the transmit process that the second packet was generated following a period of silence detected by the transmit process, the indication signifying the transmit delay rather than the network delay.

3. The method of claim 1 further comprising:
   beginning conversion of packets for playback from the packet queue only after the packet queue has become full.

4. The method of claim 1 further comprising storing the size of the packet queue in a size history of previous packet queue sizes; and adjusting the size of the packet queue in proportion to one or more recent packet queue sizes indicated by the size history.

5. The method of claim 4 further comprising adjusting the size of the packet queue based upon the bandwidth of a transmission link between the receive process and the transmit process.

6. The method of claim 5 wherein the transmission link includes at least one of dial-up modem, ISDN, T1, DSL, cable modem, and intranet.

7. The method of claim 4 wherein upward adjustments and downward adjustments made to the size of the packet queue are in proportion to the interpacket delay statistics, the upward adjustments being more proportional than the downward adjustments.

8. The method of claim 7 wherein the downward adjustment is less proportional whenever the one or more recent packet queue sizes from the size history are substantially larger than the size indicated by the interpacket delay statistics.

9. An electronic system comprising:

bus;

processor coupled to the bus;

network interface coupled to the bus at one end and that communicates packets over a packet switched network at another end;

audio I/O interface coupled to the bus at one end, and feeds an audio signal to a speaker and receives an audio signal from a microphone at another end; and memory coupled to the bus and that includes instructions which when executed by the processor cause the system to determine whether an elapsed time between arrival of first and second packets, the packets being parts of a stream of audio sent by a transmit process through the packet switched network and received by a receive process, is primarily a network delay due to the second packet being slowed while traveling through the network, or primarily a transmit delay due to a delay by the transmit process in sending the second packet, to include the elapsed time as part of interpacket delay statistics only if it is determined that the elapsed time is primarily due to the network delay, and to adjust a size of a packet queue in the receive process based on the interpacket delay statistics.

10. The system of claim 9 wherein the network interface includes a dial-up modem that transmits and receives the packets over a twisted pair line.

11. The system of claim 9 wherein the instructions cause the system to check the second packet for an indication from the transmit process that the second packet was generated following a period of silence detected by the transmit process, the indication signifying the transmit delay rather than the network delay.

12. The system of claim 9 further comprising peripheral bus interface coupled to the bus at one end and enabling communication with a peripheral device at another end.

13. The system of claim 12 further comprising electronic camera that transmits video to the bus through the peripheral bus interface, the memory including further instructions that when executed cause the system to communicate packets that include both video and audio to implement a conferencing session.

14. An article of manufacture comprising:

a machine-readable medium having instructions stored therein which, when executed by a processor, cause an electronic destination system to determine whether an elapsed time between arrival of first and second packets, the packets being parts of a stream of audio sent by a transmit process in a source system through a packet switched network and received by a receive process in the destination system, is primarily a network delay due to the second packet being slowed while traveling through the network, or primarily a transmit delay due to a delay by the transmit process in sending the second packet, to include the elapsed time as part of interpacket delay statistics only if it is determined that the elapsed time is primarily due to the network delay, and to adjust a size of a packet queue in the receive process based on the interpacket delay statistics.

15. The article of manufacture of claim 14 wherein the medium includes further instructions which implement a playback mechanism to convert packets from the packet queue back into the stream of audio that was sent by the source process.

16. The article of manufacture of claim 15 wherein the playback mechanism includes an audio decoder that produces a digital audio stream based on delivery of packets from the packet queue with consistent time intervals between consecutive packets.

17. The article of manufacture of claim 16 wherein the playback mechanism includes a video decoder that produces a digital video stream based on delivery of packets from the packet queue, the audio and video decoders being configured to implement a conferencing session over the network.

18. The article of manufacture of claim 16, in combination with a full-duplex sound system configured to operate as a computer peripheral device for implementing an audio conferencing session between the source and destination systems.

19. The article of manufacture of claim 15 wherein the medium includes further instructions which cause the destination system to encode an input audio stream, separate from the stream of audio sent by the transmit process, into response packets and configure the response packets for transmission to the source system thereby implementing a two-way conference.

* * * * *